US008483448B2

(12) United States Patent
Heeter

(10) Patent No.: US 8,483,448 B2
(45) Date of Patent: Jul. 9, 2013

(54) ELECTRONIC SALES METHOD

(75) Inventor: Thomas W. Heeter, Corning, CA (US)

(73) Assignee: Scanable, Inc., Jacksonville, FL (US)

( * ) Notice: Subject to any disclaimer, the term of this patent is extended or adjusted under 35 U.S.C. 154(b) by 605 days.

(21) Appl. No.: 12/590,940

(22) Filed: Nov. 17, 2009

(65) Prior Publication Data
US 2011/0119187 A1 May 19, 2011

(51) Int. Cl.
G06K 9/00 (2006.01)
G06Q 20/40 (2012.01)
G06Q 40/00 (2012.01)
G06K 9/03 (2006.01)
G06Q 50/26 (2012.01)

(52) U.S. Cl.
CPC ............ *G06K 9/036* (2013.01); *G06K 9/00013* (2013.01); *G06K 9/00221* (2013.01); *G06Q 50/265* (2013.01); *G06Q 20/40* (2013.01)
USPC ............... 382/115; 705/35; 705/44; 705/325; 235/379

(58) Field of Classification Search
CPC . G06K 9/036; G06K 9/00013; G06K 9/00221; G06Q 50/265; G06Q 20/40; G06Q 40/00
USPC ......... 235/375, 379–383, 487, 494; 345/173, 345/179, 180; 705/1, 1.1, 18, 26, 26.1, 35, 705/39, 325, 44; 726/5, 7, 19, 2; 382/100, 382/115
See application file for complete search history.

(56) References Cited

U.S. PATENT DOCUMENTS

| 3,584,958 | A | | 6/1971 | Miller et al. | |
| 3,944,978 | A | * | 3/1976 | Jensen et al. | 382/127 |
| 4,597,495 | A | | 7/1986 | Knosby | |
| 4,805,223 | A | | 2/1989 | Denyer | |
| 4,995,086 | A | | 2/1991 | Lilley et al. | |
| 5,633,947 | A | | 5/1997 | Sibbald | |
| 5,878,155 | A | | 3/1999 | Heeter | |
| 5,917,928 | A | * | 6/1999 | Shpuntov et al. | 382/124 |

(Continued)

FOREIGN PATENT DOCUMENTS
WO  WO 2006053122  *  5/2006

OTHER PUBLICATIONS
Irvin Baxter, Jr.; "666 The Mark of the Beast"; Jan./Feb. 1993; pp. 1-5.*

(Continued)

*Primary Examiner* — Ella Colbert
(74) *Attorney, Agent, or Firm* — John R Casperson

(57) ABSTRACT

Methods are presented for facilitating sales transactions by electronic media. A temporary barcode or other design is affixed to the person or personal object during the period of time for which a financial transaction might occur. Before the sales transaction can be consummated, the barcode information is scanned and characteristics about the scanned code are compared to characteristics about other codes stored in a database for the specific time period in question in order to verify the identity of the buyer for a given time period. Once the information is verified, the seller may be authorized to debit the buyer's electronic bank account or charge their charge card account to consummate the transaction or transactions during a period of time. The seller may transmit the buyer's barcode and the buyer transmit the seller's barcode to a clearance center, where the buyer has a smartphone capable of scanning the seller's code.

9 Claims, 2 Drawing Sheets

U.S. PATENT DOCUMENTS

| | | | | |
|---|---|---|---|---|
| 6,424,249 B1 * | 7/2002 | Houvener | | 340/5.82 |
| 6,470,891 B2 | 10/2002 | Carroll | | |
| 6,615,191 B1 | 9/2003 | Seeley | | |
| 6,998,997 B2 | 2/2006 | Stevenson et al. | | |
| 7,136,814 B1 | 11/2006 | McConnell | | |
| 7,433,844 B2 | 10/2008 | Laaskowski | | |
| 7,493,190 B1 * | 2/2009 | Tomassi | | 700/237 |
| 7,966,267 B2 * | 6/2011 | Auslander et al. | | 705/405 |
| 2004/0026501 A1 * | 2/2004 | Walsh | | 235/380 |
| 2008/0203167 A1 * | 8/2008 | Soule et al. | | 235/462.01 |
| 2009/0070273 A1 * | 3/2009 | Moryto | | 705/80 |

OTHER PUBLICATIONS

David Barnes; "Traffic World Back Page Column"; Knight-Rider/Tribune Business News; Jun. 30, 1997; p. 1.*

* cited by examiner

ELECTRONIC SALES METHOD

FIELD OF THE INVENTION

The present invention relates to the identification of humans. More particularly, the present invention relates to the application of temporary tattoos on humans for purposes of identification in order to conduct monetary and credit transactions in a secure manner.

BACKGROUND OF THE INVENTION

The disclosure of my earlier patent, U.S. Pat. No. 5,878, 155, issued Mar. 2, 1999 is incorporated herein by reference. In U.S. Pat. No. 5,878,155 at column 2, lines 40-42, the possibility employing temporary tattoos for the verification method disclosed therein is disclosed. The present invention in a preferred embodiment provides a further security improvement by employing a series of temporary tattoos, each valid only for a temporary period of time. The tattoos and the time periods are each predetermined, which makes unauthorized use very difficult to occur in the first instance; however, should an unauthorized use occur, it is very unlikely to persist for long because the tattoo information would change frequently. Moreover, in the situation where the tattoo was changed daily, reporting a "lost" card would rarely be needed because of the automated frequency of the tattoo code changes.

By analogy, the temporal aspect of the invention is like two people (the bank and its customer) following a private musical composition that only the two of them know by heart, and therefore only the two of them will know what musical note comes next in the sequence: Conceptually analogous security measures are taken by the United States military vis a vis military personnel's use of frequency hopping radio transceivers—where only the sender and receiver have prior knowledge and access to the common secure frequency sequence used as part of a single secure communication.

Finally, the temporal sequence of tattoos markings themselves need not follow any logically sequential pattern, and in fact they ideally would not follow recognizable visual sequence so that random guessing of the next tattoo in the sequence would be virtually impossible for an outsider to do.

OBJECTS OF THE INVENTION

There is a need in the art for verifying the identity of humans by electronic means that facilitates the transaction of sales through computer networks There is a need in the art for providing a secure means for verifying identity that is not mandatory for everyone, for example, something other than permanent tattoos, injectable RFID chips, or national ID cards.

There is a need for an inexpensive means of providing identity verification for electronic sales transactions that ensures both security and privacy.

There is a need in the art to provide a verification code for confirming identifies that is easily changed.

There is a need in the art to provide a constantly-changing verification code system for confirming identities.

An object of this invention is to meet the aforementioned needs.

SUMMARY OF THE INVENTION

In accordance with one embodiment of the invention, there is provided a method of human identification. The method is carried out by providing identity information for a human in an electronic database, and providing identity information for a plurality to of marks in an electronic database, each mark being associated with the identity information for the human in a validating way only for a predetermined time period. The human is then provided with a means for transferring marks which convey the mark identity information to a scanner onto their person or a personal object for use during the predetermined time period. Identification is established or, or more preferably, confirmed, by scanning a mark from a person or personal object, and determining electronically from the databases whether the scanned mark is valid.

In a preferred embodiment, the invention makes use of temporary tattoos to apply the marks. The cost of producing temporary tattoos is much less than the cost of producing magnetic strip debit or credit cards, or high security ID cards, and is easier to change. A person with high security concerns could elect to change tattoos daily, for example, while one with low security concerns could elect to change tattoos monthly. Because a tattoo can immediately be changed in the event of a security breach, risk of loss due to recurring fraudulent charges is reduced. Also, a person who does not wish to participate in the system for say, ethical, moral or religious reasons, can elect not to do so, or, in the event of a change of mind, they can cease using it, as the tattoos are not permanent. Finally, permanent tattoos fade and smudge over time, whereas temporary tattoos can be changed with sufficient frequency to remain crisp in appearance and easily scannable.

DETAILED DESCRIPTION OF THE INVENTION

Figure 1:
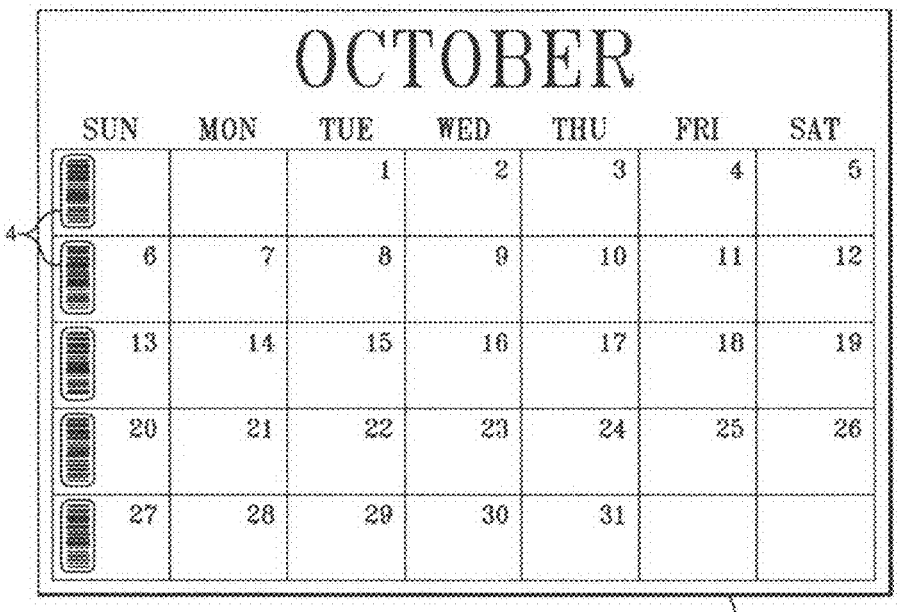
FIG. 1 is a pictorial illustration of a calendar page embodying certain features of an embodiment of the invention.
Figure 2:
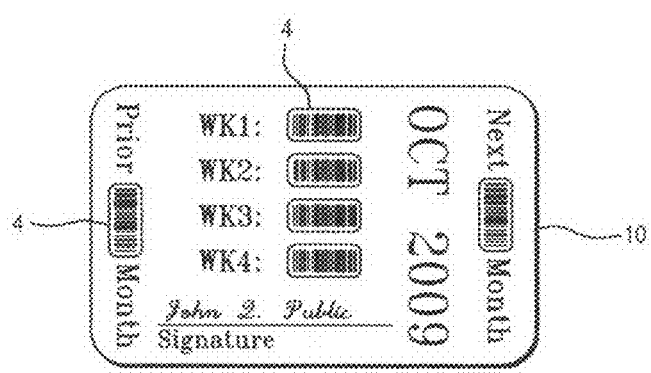
FIG. 2 is a pictorial illustration of a card embodying certain features of an embodiment of the invention.
Figure 3:
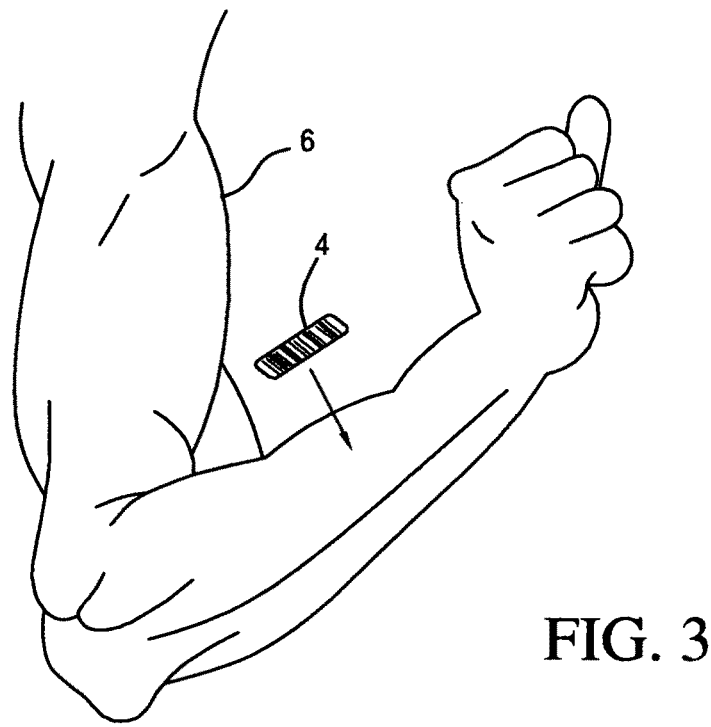
FIG. 3 is a pictorial illustration showing a temporary tattoo being applied to a user in accordance with an embodiment of the invention.
Figure 4:
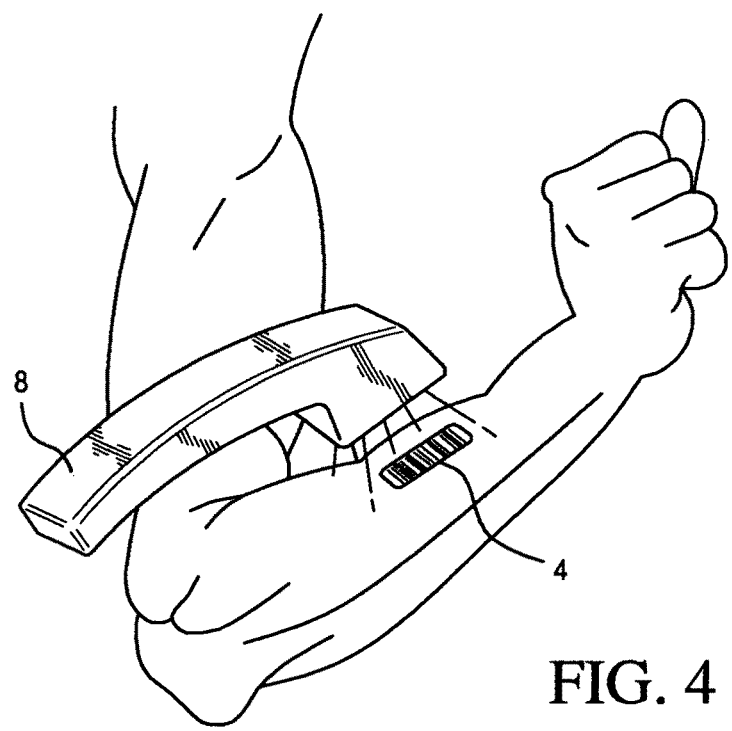
FIG. 4 is a pictorial illustration showing a temporary tattoo being scanned while on a user in accordance with an embodiment of the invention.

In accordance with one embodiment of the invention, there is provided a method of human identification. The method is carried out by providing identity information for a human in an electronic database, and providing identity information for a plurality of marks in an electronic database, each mark being associated with the identity information for the human in a validating way only for a predetermined time period. The human is then provided with a means for transferring marks which convey the mark identity information to a scanner onto their person or a personal object for use during the predetermined time period. Identification is established or, or more preferably, confirmed, by scanning a mark from a person or personal object, and determining electronically from the databases whether the scanned mark is valid.

Preferably, the scanned mark is signaled valid only if it is associated with the identity information for the human and is scanned during the predetermined time period. In a preferred embodiment, each mark is validly associated with the human identity information for only one of a plurality of predetermined chronological time periods, one mark for each time period, and the time periods are sequential. To provide for correspondence with the database on the user end, the user is provided with means for sequential transfer of a mark for each of the predetermined time periods. For example, the human user can be provided with electronic files for printing the marks on temporary tattoo sheets. The files can be transmitted over the internet, for example, or mailed in hard form. Alternatively, the human can be provided with temporary tattoo sheets carrying the marks in transferrable form thereon. The mark can be in any form that provides an easily changeable data string. For example, a barcode or other scannable design that yields a data string can be employed. Mixtures of dyes fluorescing (or absorbing) at different wavelengths could also be used to form binary codes readable with an appropriate scanner independently of the shape of the mark.

In response to a determination that the scanned mark is valid, a financial transaction for the human can be approved, and a financial account for the human can be debited in the amount of the transaction. As an extra layer of security, which can be triggered in the event that the transaction exceeds a predetermined amount, the identity of the human can be sent from the database to the point of scan for confirmation of identity, by photo-ID for example, or simply a digital image of the presumptive user of the system.

In another embodiment of the invention, identity information about a purchaser and corresponding temporal information about a tattoo is provided on a storage medium. Temporally arranged adhesive transparency sheets, to allow the printing of the tattoos or designs on the adhesive sheets, are also provided. The sheets are organized in such a way that they can be temporally verified, for example, in calendar form. Marking ink for applying to the adhesive sheets to form tattoos or designs is also provided. The marking ink is applied to the sheets to form the tattoos. Characteristics about the tattoos and corresponding temporal information during which the tattoos are considered valid are stored electronically on storage medium and linked to the identity information about the purchaser to validate use of the tattoos for purchases. Identity confirmation can be provided by transmitting back to the scan point and displaying the name associated in the database with the temporal mark.

The invention is further illustrated by the following example.

EXAMPLE

Suppose a traveler wants to go on a cruise. They receive a calendar page 2 from their bank (or any other financial institution that facilitates electronic transactions) that has preprinted temporary tattoos 4, say, as part of a calendar. See FIG. 1. These could either be based on the customer's selection, or, alternatively, the customer could develop their own tattoo designs at home and then submit their own design(s) to the bank to be included in the preprinted calendar.

The traveler simply peels the given tattoo off for the preselected days for which he or she will be using it, and then puts the tattoo on a scannable part of their body, for example, their arm 6, or on a card, for example, a photo-ID such as their driver's license, or their passport. Suppose the traveler has selected "weekly" security. In that case, they would change tattoos (and thereby security codes, or access codes) once per week according to a predetermined schedule. The traveler then logs into a terminal to book the reservation either from home or in the offices of a travel agent.

The computer scan verifies that the tattoo code is for that person, and that it is being used during an authorized time period. Once the data has been verified, they make the purchase and have their preferences, such as meal preferences, registered based on the tattoo. The temporal tattoo system provides more security than credit cards because the information is changed with a relatively high degree of frequency at a very minimal cost as compared to issuing a new credit card. Typically, new credit cards are issued at intervals from one to three years for a given customer unless the customer reports some kind of irregularity for which the customer has the burden to discover and report.

To make a purchase, the user has the mark scanned by scanner 8 and the information is transmitted to a database for confirmations and approval. If desired, a series of tattoo codes could be provided on a credit card sized (about 85×54 mm) card 10 which could be transferred to the user or read directly from the card.

While certain preferred embodiments have been described herein, the invention is not to be construed as being so limited, except to the extent that such limitations are found in the claims.

What is claimed is:

1. A method of human identification comprising the steps of:
   providing, in an electronic database, identity information for a human:
   providing, in the electronic database containing the identity information for the human, or in a different electronic database, identity information for each of a plurality of marks, the identity information for each mark being associated with the identity information for the human in a validating way by validating each mark for use during a predetermined time period;
   providing the human with a transfer sheet for transferring, onto their person or a personal object for use during the predetermined time period, a mark which conveys the mark identity information to a scanner;
   scanning a mark from a person or personal object; and
   determining electronically from the time, the electronic database containing the identity information for the human, and the electronic database containing the identity information for the plurality of marks, whether the scanned mark is validated for use.

2. The method as in claim 1 wherein the scanned mark is determined as validated for use by associating the mark identity information with the identity information for the human during the predetermined time period.

3. The method as in claim 1 further comprising approving a financial transaction for the human in response to a determination that the scanned mark is validated for use.

4. The method as in claim 3 further comprising debiting a financial account of the human in the amount of the transaction.

5. A method of human identification comprising the steps of:
   providing, in an electronic database, personal identity data for a human;
   providing, in the same electronic database as the personal identity data for the human, or in a different electronic database, visually identifying characteristics data for each of a plurality of marks, with the visually identifying characteristics data for each mark being associated with the personal identity data for the human in a validating way by validating each mark for use during a predetermined time period;
   applying one of said plurality of marks to an appendage or personal object of said human for use during the predetermined time period;
   providing for scanning the mark previously applied to the human or personal object;
   electronically transferring the visually identifying characteristics data for the scanned mark;

and determining electronically from the time, the personal identity data for the human and the visually identifying characteristics data for the plurality of marks whether the scanned mark is validated for use.

6. The method as in claim 5 wherein the scanned mark is determined as validated for use by associating the identifying characteristics data of the mark with the personal identity data for the human during the predetermined time period.

7. The method as in claim 5 further comprising approving a financial transaction for the human in response to a determination that the scanned mark is validated for use.

8. The method as in claim 7 wherein the mark comprises a temporary tattoo of a barcode or other scannable design that yields a data string.

9. The method as in claim 7 further comprising debiting a financial account of the human in the amount of the transaction.

\* \* \* \* \*